United States Patent
Lee et al.

(10) Patent No.: US 8,412,242 B2
(45) Date of Patent: Apr. 2, 2013

(54) METHOD AND APPARATUS FOR SENDING AND RECEIVING CHANNEL STATE INFORMATION IN MULTIPLE-INPUT MULTIPLE-OUTPUT NETWORK WIRELESS COMMUNICATION SYSTEMS

(75) Inventors: In Ho Lee, Gyeonggi-do (KR); Cheol Mun, Gyeonggi-do (KR); Ju Ho Lee, Suwon-si (KR); Jin Kyu Han, Seoul (KR); Jong Gwan Yook, Seoul (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 274 days.

(21) Appl. No.: 12/982,322

(22) Filed: Dec. 30, 2010

(65) Prior Publication Data

US 2011/0159907 A1   Jun. 30, 2011

(30) Foreign Application Priority Data

Dec. 30, 2009   (KR) .................. 10-2009-0134817

(51) Int. Cl.
*H04B 7/00*   (2006.01)

(52) U.S. Cl. ........ 455/500; 455/103; 455/63.1; 375/260

(58) Field of Classification Search ................. 455/101, 455/103, 63.1, 442, 450, 90.2, 500; 375/267, 375/299, 141, 144, 221, 219, 260, 316, 295; 370/330, 343, 331, 328, 329
See application file for complete search history.

(56) References Cited

U.S. PATENT DOCUMENTS

| | | | |
|---|---|---|---|
| 7,447,270 B1 * | 11/2008 | Hottinen | 375/267 |
| 2008/0267133 A1 * | 10/2008 | Shida et al. | 370/334 |
| 2009/0285325 A1 * | 11/2009 | Zhou | 375/267 |
| 2010/0067480 A1 * | 3/2010 | Wang et al. | 370/330 |
| 2011/0135021 A1 * | 6/2011 | Hatakawa et al. | 375/260 |
| 2012/0057566 A1 * | 3/2012 | Ahmadi | 370/331 |
| 2012/0140723 A1 * | 6/2012 | Taoka et al. | 370/329 |
| 2012/0182964 A1 * | 7/2012 | Gao et al. | 370/330 |

\* cited by examiner

*Primary Examiner* — Sujatha Sharma
(74) *Attorney, Agent, or Firm* — The Farrell Law Firm, P.C.

(57) ABSTRACT

A method and an apparatus for sending and receiving channel state information in network Multiple-Input Multiple-Output (MIMO) wireless communication systems are provided. Hybrid feedback technology is provided to transfer complete Channel State Information (CSI) to a transmitter by efficiently combining limited amounts of long-term channel information and short-term channel information are in a down link MIMO network system.

16 Claims, 10 Drawing Sheets

METHOD AND APPARATUS FOR SENDING AND RECEIVING CHANNEL STATE INFORMATION IN MULTIPLE-INPUT MULTIPLE-OUTPUT NETWORK WIRELESS COMMUNICATION SYSTEMS

PRIORITY

This application claims priority under 35 U.S.C. §119(a) to Korean Patent Application No. 10-2009-0134817, which was filed in the Korean Intellectual Property Office on Dec. 30, 2009, the disclosure of which is incorporated herein in its entirety by reference.

BACKGROUND OF THE INVENTION

1. Field of the Invention

The present invention relates generally to a method and an apparatus for sending and receiving channel state information in network Multiple-Input Multiple-Output (MIMO) wireless communication systems, and more particularly, to a method and an apparatus for sending and receiving channel state information that transmit channel information to be divided into short-term channel information and long-term channel information and restoring full Channel State Information (CSI) in MIMO network wireless communication systems.

2. Description of the Related Art

A MIMO system has been suggested to provide data service of high speed and high equality in wireless communication where a transmitter and a receiver of the MIMO system have a plurality of antennas. Spatial processing is required in a transmitter and a receiver in MIMO technology. Accordingly, the transmitter and the receiver should have MIMO CSI between the transmitter and the receiver.

Specifically, the transmitter should have down link MIMO channel information from $n_T$ transmission antennas of a Base Transceiver Station (BTS) to $n_R$ reception antennas of an Access Terminal (AT) in a down link. Because a down link and an up link in a Frequency Division Multiplexing (FDM) system use different frequency domains, in order a BTS for having a down link CSI, a receiver should estimate a down link channel and feedback the estimated down link CSI to a transmitter. To feedback complete CSI to the transmitter, because transmission of much reverse link information is required, a user can use only minimum feedback information up to now.

As a result, to maximize system transmission capacity of a MIMO network, there is a need for research with respect to a feedback channel, a transceiver structure, and transmitting/receiving operations of technology transferring complete down link channel information to a transmitter using a limited amount of feedback information.

SUMMARY OF THE INVENTION

The present invention has been made in view of at least the above problems, and provides a method and an apparatus for sending and receiving channel state information that may transfer complete down link CSI to a BTS by efficiently combining a limited amount of long-term feedback information with a limited amount of short-term feedback information in a MIMO network wireless communication systems.

In accordance with an aspect of the present invention, a method for sending channel state information of a terminal in a network MIMO system having a plurality of base stations and the terminal, includes estimating a down link channel from a signal received from the base station; extracting long-term channel information from the extracted down link channel being in a state of a down link channel which does not instantaneously change in every frame and transmitting the long-term channel information through a long-term feedback channel divided and allocated into plural frames; and extracting short-term channel information from the extracted down link channel being in a state of a down link channel which instantaneously changes in every frame and transmitting the short-term channel information through a short-term feedback channel allocated every frame.

In accordance with another aspect of the present invention, a method for receiving channel state information of a network in a network MIMO system having a plurality of base stations and the terminal, includes receiving long-term channel information being in a state of a down link channel which does not instantaneously change in every frame through a long-term feedback channel allocated through a plurality of frames by one of the plurality of base stations; receiving short-term channel information being in a state of a down link channel which instantaneously changes in every frame to which a short-term feedback channel is allocated by the one base station; and combining the long-term channel information and the short-term channel information by the one base station to restore a channel matrix indicating a down link channel between the base station and the terminal.

In accordance with another aspect of the present invention, an apparatus for sending channel state information of a terminal in a network MIMO system having a plurality of base stations and the terminal, includes a transceiver performing data transmission and reception to and from the base station; a channel estimator estimating a down link channel from a signal received from the base station; a long-term channel information processor extracting long-term channel information from the extracted down link channel being in a state of a down link channel which does not instantaneously change in every frame and transmitting the long-term channel information through a long-term feedback channel divided and allocated into plural frames using the transceiver; and a short-term channel information processor extracting short-term channel information from the extracted down link channel being in a state of a down link channel which instantaneously changes in every frame and transmitting the short-term channel information through a short-term feedback channel allocated every frame using the transceiver.

In accordance with another aspect of the present invention, an apparatus for receiving channel state information of a network in a network MIMO system having a plurality of base stations and the terminal, includes a feedback receiver of one of the plurality of base stations receiving and restoring long-term channel information being in a state of a down link channel which does not instantaneously change in every frame through a long-term feedback channel allocated through a plurality of frames, and receiving and restoring short-term channel information being in a state of a down link channel which instantaneously changes in every frame through a short-term feedback channel allocated every frame; and a channel matrix restoring unit of the one base station combining the long-term channel information and the short-term channel information to restore a channel matrix indicating a down link channel between the base station and the terminal.

In the present invention as described above, a terminal may transmit long-term channel information according to a long-term feedback channel transmission period and short-term channel information according to a short-term feedback channel transmission period to reduce a load and restore complete CSI at the time of transmitting channel information.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EMBODIMENTS OF THE PRESENT INVENTION

Embodiments of the present invention are described with reference to the accompanying drawings in detail. The same reference numbers are used throughout the drawings to refer to the same or like parts. In addition, detailed descriptions of well-known functions and structures incorporated herein may be omitted to avoid obscuring the subject matter of the present invention.

The present invention provides technology that may transfer complete down link CSI to a transmitter by efficiently combining a limited amount of long-term feedback information with a limited amount of short-term feedback information in network MIMO wireless communication systems.

To feedback complete CSI according to an embodiment of the present invention, a down link MIMO channel matrix in each terminal is divided into a long-term eigen matrix which does not instantaneously change, a short-term gain matrix which instantaneously changes, and an output matrix, and the divided matrixes are quantized. The quantized eigen matrix is divided into plural frames, and the plural frames are transmitted through a long-term feedback channel to be transmitted for a long time, and the gain matrix and the output matrix are transmitted to a base station through a short-term feedback channel to be transmitted every frame.

In an embodiment of the present invention, a long-term feedback channel is a transmission resource allocated through a plurality of frames, and the present invention transmits long-term channel information to be divided into plural frames of the long-term feedback channel. The long-term channel information is CSI that does not change for at least one frame, which may become an eigen matrix.

Corresponding to the long-term feedback channel, in an embodiment of the present invention, a short-term feedback channel is a transmission resource allocated for every frame, and the present invention transmits short-term channel information every frame of the short-term feedback channel. The short-term channel information is channel state information that changes with every frame, which can become a gain matrix and an output matrix.

The base station may combine long-term and short-term channel information transmitted to be divided into a long-term feedback channel and a short-channel feedback to restore a channel matrix between a terminal and the base station, and restore a down link MIMO channel matrix between the terminal and plural base stations using the restored channel matrix and a channel state coefficient between base stations.

An embodiment of the present invention provides a code book for scalar quantization and vector quantization required for a channel matrix feedback, and a vector code book to quantize an inter-cell channel coefficient. Accordingly, an embodiment of the present invention provides a designed scalar code book by a non-uniform quantization in consideration of distribution of gain values according to the number of transmitting/receiving antennas and a channel environment for diagonal component quantization of a gain matrix. Furthermore, the present invention provides a vector code book designed such that vectors of the $n_R \times 1$ size have isotropic distribution in an $n_R$-dimensional complex vector space for a column vector quantization of an output matrix. The present invention provides a vector code book designed such that vectors of the size $M \times 1$ have isotropic distribution in an M-dimensional complex vector space for quantization of an inter-cell channel coefficient.

Figure 1:
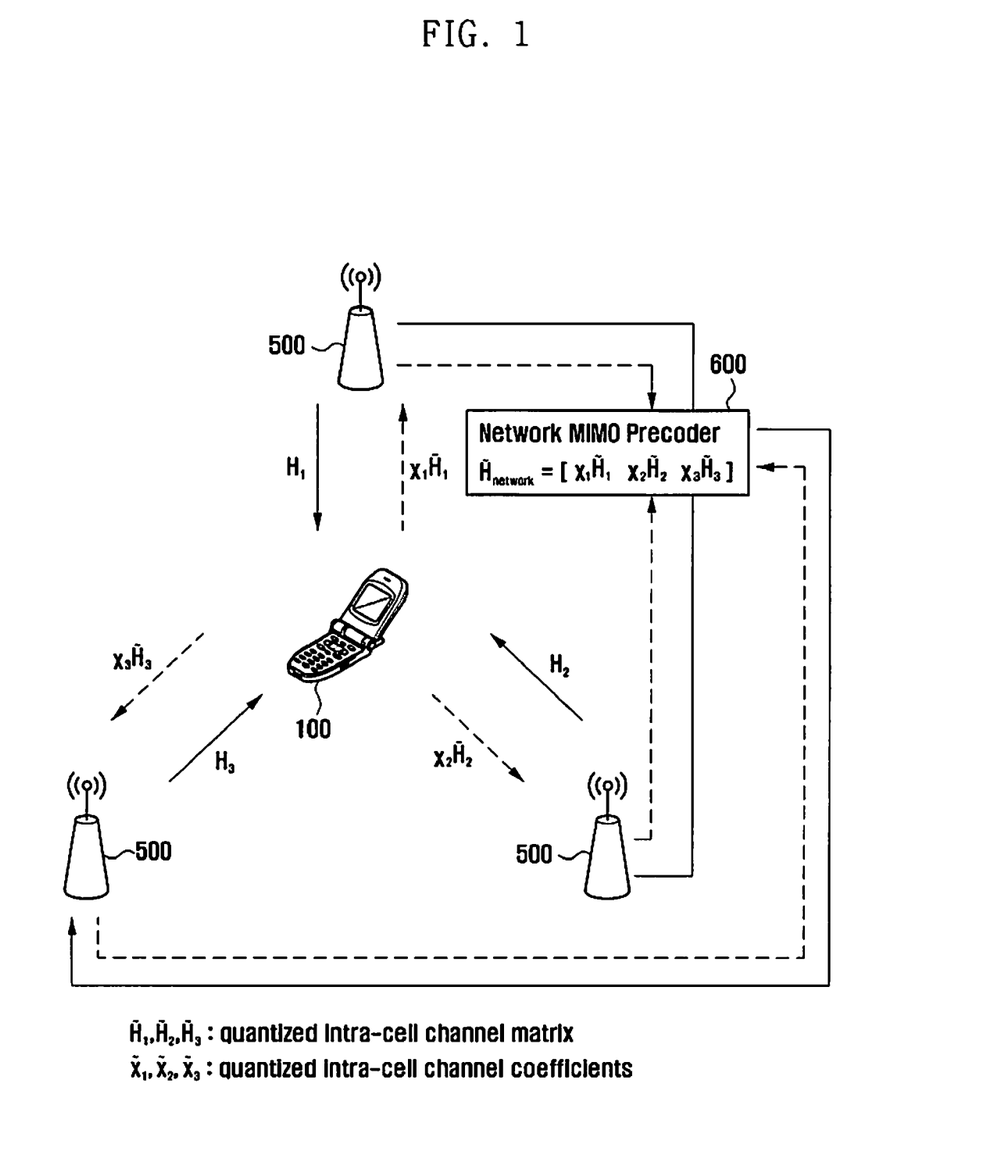
FIG. 1 is a diagram illustrating a MIMO network system according to an embodiment of the present invention.

FIG. 1 is a diagram illustrating a MIMO network system according to an embodiment of the present invention.

Referring to FIG. 1, an embodiment of the present invention considers a Collaborative Base Transceiver Station (referred to as "C-BTS" hereinafter) 500 and a collaborative Access Terminal (referred to as "AT" hereinafter) 100 in a forward link system in which the AT 100 is distributed in a cluster composed of M BTSs. In the embodiment of the present invention, it is assumed that each C-BTS 500 uses $n_T$ transmission antennas, and all the ATs 100 use $n_R$ reception antennas.

An M value being the number of C-BTSs 500 capable of operating a collaboration method may instantaneously change due to a instantaneous channel variation between respective ATs 100 and C-BTSs 500. The foregoing embodiment considers a cluster composed of three C-BTSs 500 (M=3) for explanation. However, the present invention can extend to a cluster including an optional number of C-BTSs 500.

It is assumed that x is an $Mn_T \times 1$ data symbol vector simultaneously transmitted to a maximum of $Mn_T$ ATs 100 through a total of $Mn_T$ transmission antennas of M-BTSs 500, and y is a $n_R \times 1$ received vector of the AT 100. Here, assuming a frequency non-selective fading, a received signal can be expressed by a following Equation (1).

$$y = [\sqrt{\gamma_1}H_1 \sqrt{\gamma_2}H_2 \sqrt{\gamma_3}H_3]Fx + n \quad (1)$$

where, $\gamma_m$ is an average Signal-to-Noise Ratio (SNR) from an m-th C-BTS 500 to an AT 100, and $H_m$ is an $n_R \times n_T$ complex matrix from the m-th C-BTS 500 to the AT 100. The $H_{network}$ is $n_R \times Mn_T$ collaborative channel matrix from M C-BTSs 500 to the AT 100, which is $H_{network} = [\sqrt{\gamma_1}H_1 \sqrt{\gamma_2}H_2 \sqrt{\gamma_3}H_3]$, and the $n_k$ is an $n_R \times 1$ Additive White Gaussian Noise (AWGN) vector. Further, F is an $Mn_T \times Mn_T$ transmission pre-coding for joint pre-coding of the x.

The AT 100 estimates down link channel $\{H_m\}_{m=1,\ldots,3}$ from neighboring C-BTSs 500, and quantizes it to $\{\tilde{H}_m\}_{m=1,\ldots,3}$ by hybrid feedback technology according to the present invention and feedbacks the quantized $\{\tilde{H}_m\}_{m=1,\ldots,3}$ to respective C-BTSs 500. Moreover, the AT 100 estimates an inter-cell channel coefficient between cells compensating for a channel difference between the C-BTSs 500, quantizes it to $\{\chi_m\}_{m=1,\ldots,3}$, and feedbacks the quantized $\{\chi_m\}_{m=1,\ldots,3}$ to the respective C-BTSs 500.

The C-BTSs 500 connect with a MIMO network pre-coder (referred to as 'pre-coder' hereinafter) through high speed wideband wired communication network, and transfer the feedback quantized complete CSIs from the AT 100 to the pre-coder 600 through a wired communication network.

The pre-coder 600 calculates various MIMO technique combinations for the ATs 100 included in a corresponding cluster using feedback channel information $\tilde{H}_{network} = [\chi_1 \tilde{H}_1 \ \chi_2 \tilde{H}_2 \ \chi_3 \tilde{H}_3]$, and a received SINR of ATs 100 according to a pre-coding matrix by the combinations. Based on the calculation, the pre-coder 600 determines AT 100 set transmitting optimized data, a MIMO technology combination to be used by corresponding ATs 100, and a pre-coding matrix. The pre-coder 600 informs a scheduler of a corresponding C-BTS 500 of weight information to be used by ATs 100 transmitting data selected by scheduling and a corresponding AT 100, and Modulation and Coding Scheme (MCS) information of data to be transmitted, and a scheduler of each C-BTS 500 transmits data to a corresponding AT 100 by referring information provided from the pre-coder 500.

The AT 100 estimates an intra-cell down link channel $H_m$ from the C-BTS 500, and feedbacks quantized complete CSI $\tilde{H}_m$ to respective C-BTS 500 using a limited amount of reverse link feedback information. There is a need for a large amount of instantaneous short-term reverse link feedback information to feedback an instantaneously changed intra-cell down link channel $H_m$ itself to a transmitter. Such information is information related to a channel state. Hereinafter, channel state information transmitted from the AT 100 to the C-BTS 500 with a short-term period is referred to as "short-term channel information".

Since a plurality of links divide a limited reverse link band width into a feedback channel and a data channel to be used, increase of short-term channel information transmitted every reverse link transmission frame is directly connected to reduction of a reverse link data channel capacity and a forward link data channel capacity according to reduction of a feedback channel capacity. Because reverse link feedback information transmitted with long-term for a long time through much reverse link transmission frames has small transmission feedback capacity by reverse link transmission frames, it influences reverse and forward data channel capacities a little. However, long-term channel information is not suitable to transmit instantaneously changed channel information. Hereinafter, channel state information transmitted from the AT 100 to the C-BTS 500 with a long-term period is referred to as 'long-term channel information'.

Accordingly, down link channel information may be divided into long-term channel information not changed for a long time and short-term channel information instantaneously changed, and the long-term channel information and the short-term channel information are divided and transmitted through a long-term feedback channel transmitted for a long time through many frames and a short-term feedback channel transmitted every frame.

Hybrid feedback technology according to the present invention divides and expresses an intra-cell down link channel matrix $H_m$ into an eigen matrix $E_m$, a gain matrix $D_m$, and an output matrix $W_m$. In the embodiment of the present invention, the eigen matrix $E_m$ becomes long-term channel information, the gain matrix $D_m$ and the output matrix $W_m$ become short-term channel information. The divided matrixes can expressed by a following Equation (2).

$$:H_m = W_m D_m E_m^H \tag{2}$$

After divided as illustrated in the Equation (2), the eigen matrix $E_m$, the gain matrix $D_m$, and the output matrix $W_m$ are quantized, and the quantized eigen matrix $E_m$ is transmitted through a long-term feedback channel, and the quantized gain matrix $D_m$, and the quantized output matrix $W_m$ are transmitted through a short-term feedback channel.

In the Equation (2), because an unitary matrix $E_m$ of the size $n_T \times n_T$ is an eigen matrix of $E[H_m^H H_m]$, and obtained by accumulating and averaging covariance $H_m^H H_m$ of an intra-cell down link channel matrix $H_m$ for an enough long time, it does not change for a long time. Here, the enough long time may be one period of at least long-term feedback channel.

The gain matrix $D_m$ is a diagonal matrix of the size $n_R \times n_T$, and diagonal components are composed of R ($R \leq \min(n_R, n_T)$) values and $\min(n_R, n_T) - R$ zeros, with the size greater than or equal to a constant reference value $R_{th}$. Diagonal components constituting the gain matrix $D_m$ indicate an instantaneous gain value received when beam forming is achieved by $n_T$ column vectors of an eigen matrix $E_m$. Consequently, according to an instantaneous channel situation, the number R of gain values greater than or equal to a reference value and values instantaneously change. Specifically, when a transmission space correlation is high, the number R of gain values equal to a constant reference value $R_{th}$ tends to become smaller, and respective gains tend to be increased.

The output matrix $W_m$ of the size $n_R \times n_R$ is composed of vectors of the size $n_R \times 1$ having R unit norm characteristics corresponding to R gain values of a $D_m$ matrix and $n_R - R$ zero vectors of the size $n_R \times 1$. R column vectors constituting the output matrix $W_m$ mean receiving weight vectors to obtain R gain values. Accordingly, R column vectors instantaneously change according to an instantaneous channel situation.

For example, when $n_T$ is 4 and $n_R$ is 2, an intra-cell down link channel matrix $H_m$ can be expressed by the following Equation (3) to be divided into an eigen matrix $E_m$, a gain matrix $D_m$, and an output $W_m$.

$$: H_m = W_m D_m E_m^H \tag{3}$$
$$= [w_{m,1} \ w_{m,2}] \begin{bmatrix} d_{m,1} & 0 & 0 & 0 \\ 0 & d_{m,2} & 0 & 0 \end{bmatrix}$$
$$[e_{m,1} \ e_{m,2} \ e_{m,3} \ e_{m,4}]$$

where, $\{e_{m,n}\}_{n=1,2,3,4}$ are four column vectors constituting the eigen matrix $E_m$, and a norm of $\{W_{m,n}\}_{n=1,2}$ constituting $W_m$ is 1. That is, $\|w_{m,1}\| = \|w_{m,2}\| = 1$. Further, it is assumed that all of diagonal components $\{d_{m,n}\}_{n=1,2}$ constituting the gain matrix $D_m$ have the size equal to or greater than a constant reference value $R_{th}$.

Each AT 100 expresses an intra-cell down link channel matrix $H_m$ by the Equation (2) to be divided into the eigen matrix $E_m$, the gain matrix $D_m$, and the output matrix $W_m$, and quantizes the divided matrixes.

The AT 100 quantizes and transmits the eigen matrix $E_m$ through a long-term feedback channel. Furthermore, the AT 100 scalar-quantizes and transmits R diagonal components $\{d_{m,n}\}_{m=1,\ldots,R}$ of the gain matrix $D_m$ through a short-term feedback channel. In addition, the AT 100 vector-quantizes and transmits R $n_R \times 1$ column vectors constituting the output matrix $W_m$ through a short-term feedback channel.

The gain matrix $D_m$ and the output matrix $W_m$ can be transmitted to be divided. However, without division of the gain matrix and the output matrix, after one matrix may be quantized, the quantized matrix can be transmitted through a short-term feedback channel. As a result, short-term channel information really required in hybrid feedback technology according to an embodiment of the present invention is information regarding R quantized scalar values and R quantized $n_R \times 1$ vector values.

Figure 2:
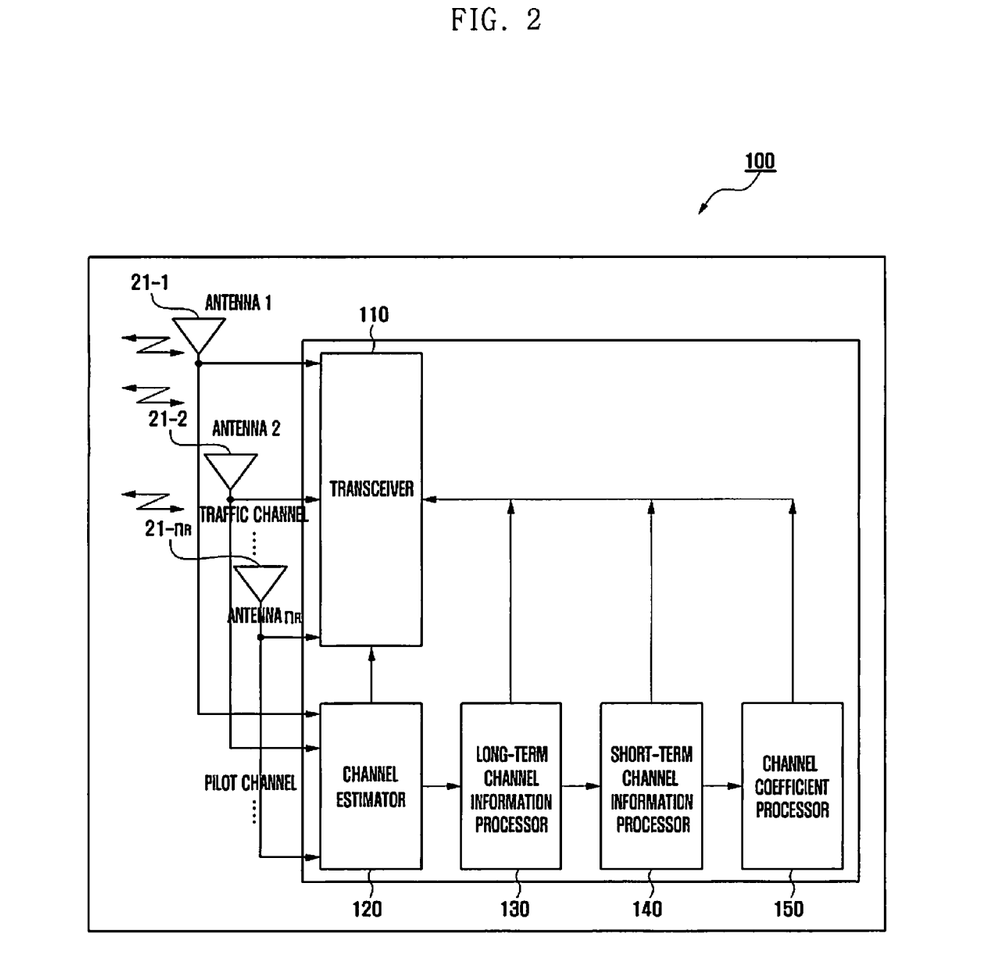
FIG. 2 is a diagram illustrating a schematic configuration of an apparatus for transmitting channel state information of a terminal according to an embodiment of the present invention.

FIG. 2 is a diagram illustrating a schematic configuration of an apparatus for transmitting channel state information of a terminal according to an embodiment of the present invention.

Referring to FIG. 2, an AT 100 includes a transceiver 110, a channel estimator 120, a long-term channel information processor 130, a short-term channel information processor 140, and a channel coefficient processor 150. Here, a terminal uses a MIMO antenna and the $n_R$ MIMO antenna can be used to be indicated as reference numerals 21-1 to 21-$n_R$ in FIG. 2.

The transceiver 110 includes a demodulator, and receives and outputs pilot channels received from neighboring C-BTSs.

The channel estimator 120 estimates pilot channels received from neighboring C-BTSs to estimate down link channels $\{H_m\}_{m=1,\ldots,M}$ from M C-BTSs 500 to a corresponding AT 100. Moreover, the channel estimator 120 estimates down link MIMO network channel $H_{network}=[\sqrt{\gamma_1}H_1 \; \sqrt{\gamma_2}H_2 \; \sqrt{\gamma_3}H_3]$ from M C-BTSs 500 to a corresponding AT 100.

The long-term channel information processor 130 calculates and quantizes an eigen matrix $E_m$ of a corresponding down link channel $H_m$ using down link channel information $H_m$ from a m-th C-BTS 500 to an AT 100 estimated by the channel estimator 120. The long-term channel information processor 130 feedbacks the quantized eigen matrix $\tilde{E}_n$ to an m-th C-BTS as Long-Term Eigen Matrix (LTEM) feedback information $LTEM_m$ through a long-term feedback channel. The long-term channel information processor 130 performs such a procedure for M C-BTSs. Here, the eigen matrix $E_m$ of the size $n_T \times n_T$ can be calculated by averaging covariance $H_m{}^H H_m$ of $H_m$ for an enough time to obtain a covariance matrix $E[H_m{}^H H_m]$, and performing Eigen Value Decomposition (EVD) for the covariance matrix $E[H_m{}^H H_m]$. The larger a corresponding eigen value is, $n_T$ Column vectors, namely, eigen vectors constituting $E_m$, are arranged at a left side. Accordingly, when $E_m=[e_{m,1} \; e_{m,2} \ldots e_{m,n_T}]$, a maximum eigen vector becomes $e_{m,1}$.

The short-term channel information processor 140 multiplies Hermitain of an eigen matrix $\tilde{E}_m$ obtained by the long-term channel information processor 130 by the down link channel $H_m$ as illustrated in a following Equation (4).

$$H_m \tilde{E}_m{}^H = F_m = [f_{m,1}, f_{m,1} \ldots f_{m,n_T}] \quad (4)$$

where, $n_R \times n_T$ matrixes $F_m$ are composed of $n_T$ column vectors $\{f_{m,n}\}_{n=1,\ldots,n_T}$ having the size $n_R \times 1$. The short-term channel information processor 140 performs the foregoing procedure for M C-BTSs.

The short-term channel information processor 140 may quantize and feedback the obtained $F_m$ to an m-th C-BTS 500 as short-term channel information through a short-term feedback channel.

As illustrated previously, $F_m$ can be divided into two components including a gain matrix $D_m$ and an output matrix $W_m$. The short-term channel information processor 140 may divide the $F_m$ into a gain matrix $D_m$ and an output matrix $W_m$, scalar and vector-quantize the gain matrix $D_m$ and the output matrix $W_m$, and feedback the quantized gain matrix $D_m$ and output matrix $W_m$ to the m-th C-BTS as short-term channel information through a short-term feedback channel.

As illustrated earlier, the following is an operation of the short-term channel information processor 140 separately transmitting the matrixes. The short-term channel information processor 140 obtains a norm of $n_T$ column vectors of a matrix $F_m$, namely, $\{\|f_{m,n}\|\}_{n=1,\ldots,n_T}$, and compares the $\{\|f_{m,n}\|\}_{n=1,\ldots,R}$ with a reference value $R_{th}$. The short-term channel information processor 140 scalar-quantizes R values $\{\|f_{m,n}\|\}_{n=1,\ldots,R}$ greater than the $R_{th}$. Subsequently, the short-term channel information processor 140 feedback indexes of R quantized scalar values to the m-th C-BTS 500 through a short-term feedback channel as R Short-term Gain Index (SGI) feedback information $\{SGI_{m,n}\}_{n=1,\ldots,R}$. Here, scalar quantization designs a scalar code book $F_{scalar}$ composed of plural scalar values, and selects a scalar value minimizing a difference with $\{\|f_{m,n}\|\}_{n=1,\ldots,R}$ as illustrated in the following Equation (5).

$$\tilde{d}_{m,n} = \arg\min_{d \in F_{scalar}} (d - \|f_{m,n}\|)^2, n = 1, \ldots, R \quad (5)$$

The scalar code book $F_{scalar}$ is preferably designed by non-uniform quantization in consideration of distribution of $\{\|f_{m,n}\|\}_{n=1,\ldots,R}$ according to the number of transmission/reception antennas and a channel environment. A quantized scalar value indicated by a feedback $\{SGI_{m,n}\}_{n=1,\ldots,R}$ is R diagonal components constituting a gain matrix $D_m$ of the Equation (2). The short-term channel information processor 24 performs the scalar quantization for M C-BTSs 500.

The short-term information processor 140 normalizes R column vectors $\{\|f_{m,n}\|\}_{n=1,\ldots,R}$ of a matrix $F_m$ as illustrated in a following Equation (6). Next, the short-term channel information processor 140 vector-quantizes and feedbacks R normalized vectors $\{\|\hat{f}_{m,n}\|\}_{n=1,\ldots,R}$ to the m-th C-BTS through a short-term feedback channel as R Output Vector Index (OVI) feedback $\{OVI_{m,n}\}_{n=1,\ldots,R}$.

$$\hat{f}_{m,n} = \frac{f_{m,n}}{\|f_{m,n}\|}, n = 1, \ldots, R \quad (6)$$

The quantized vector value indicated by a feedback $\{OVI_{m,n}\}_{n=1,\ldots,R}$ indicates R column vector constituting an output matrix $W_m$ of the Equation (2). The short-term channel information processor 140 performs the vector quantization for M C-BTSs 500. The vector quantization designs a vector code book $F_{intra}$ composed of vectors having the size $n_R \times 1$, and selects a vector minimizing a distance $D(w, \hat{f}_{m,n})$ from $\{\|\hat{f}_{m,n}\|\}_{n=1,\ldots,R}$, namely, exactly imitating $\{\|\hat{f}_{m,n}\|\}_{n=1,\ldots,R}$ the most from the vector code book $F_{intra}$.

$$\tilde{w}_{m,n} \arg\min_{w \in F_{intra}} D(w, \hat{f}_{m,n}), n = 1, \ldots, R \quad (7)$$

Vectors of the size $n_R \times 1$ constituting the vector code book $F_{intra}$ should be designed to have isotropic distribution in an $n_R$-dimensional complex vector space. Accordingly, the vectors of the size $n_R \times 1$ may use a code book designed by a Random Vector Quantization (RVQ) scheme and a Grassmannian code book adapted to IEEE802.16e.

The channel coefficient processor 150 constructs a quantized intra-cell channel matrix $\{\tilde{H}_m\}_{m=1,\ldots,M}$ expressed by a following Equation (8). That is, the quantized intra-cell channel matrix $\{\tilde{H}_m\}_{m=1,\ldots,M}$ can be obtained by combining all values quantized by the long-term channel information processor 130 and the short-term channel information processor 140. The values are obtained by quantizing the eigen matrix $E_m$, the gain matrix $D_m$, and the output matrix $W_m$ that are structural components of a channel.

Subsequently, the channel coefficient processor 150 estimates an inter-cell channel coefficient compensating for a channel difference between C-BTSs 500 to exactly imitate the estimated down link MIMO network channel $H_{network}=[\sqrt{\gamma_1}H_1 \ \sqrt{\gamma_2}H_2 \ \sqrt{\gamma_3}H_3]$ the most, and quantizes it to obtain and transmit $\{\chi_m\}_{m=1,\ldots,3}$ to a C-BTS 500 through the short-term feedback channel in an Inter-Cell Vector Index (ICVI) feedback way.

$$\tilde{H}_m = \tilde{W}_m \tilde{D}_m \tilde{E}_m^H = [\tilde{w}_{m,1} \ldots \tilde{w}_{m,R} 0 \ldots 0] \text{diag}\{\tilde{d}_{m,1}, \ldots, \tilde{d}_{m,R}, 0, \ldots, 0\} \tilde{E}_m^H \quad (8)$$

Namely, the channel coefficient processor 150 constructs a quantized intra-cell channel matrix $\{\tilde{H}_m\}_{m=1,\ldots,M}$ by combining the $\tilde{E}_m$, the $\tilde{D}_m$, and the $\tilde{W}_m$ previously obtained as illustrated in the Equation (8). Next, the channel coefficient processor 150 vector-quantizes a vector $c=[\chi_1 \ldots \chi_M]^T$ composed of an inter-cell channel coefficient minimizing a distance between a MIMO network channel $\tilde{H}_{network}=[\chi_1\tilde{H}_1 \ \chi_2\tilde{H}_2 \ \chi_3\tilde{H}_3]$ composed of a quantized intra-cell channel matrix $\{\tilde{H}_m\}_{m=1,\ldots,M}$ and a real down link MIMO network channel $H_{network}=[\sqrt{\gamma_1}H_1 \ \sqrt{\gamma_2}H_2 \ \sqrt{\gamma_3}H_3]$ estimated by the channel estimator 120. The vector quantization designs an inter-cell channel vector code book $F_{inter}$ composed of vectors having the size $M \times 1$, and selects a vector minimizing a distance $D(\tilde{H}_{network}, H_{network})$ between $H_{network}$ and $\tilde{H}_{network}$ as illustrated in a following Equation (9) from the designed inter-cell channel vector code book $F_{inter}$.

$$: c = \arg\min_{c \in F_{inter}} D(\tilde{H}_{network}, H_{network}) \quad (9)$$

Assuming that average SNR $\{\gamma_m\}_{m=1,\ldots,M}$ from different C-BTSs 500 to one AT 100 in a cluster performing cooperation communication are similar thereto, vectors having the size $M \times 1$ constituting the inter-cell channel vector code book $F_{inter}$ should be designed to have isotropic distribution in an M-dimensional complex vector space. Accordingly, the vectors having the size $M \times 1$ may use a code book designed in an existing RVQ scheme or a Grassmannian adapted to IEEE802.16e.

Figure 3:
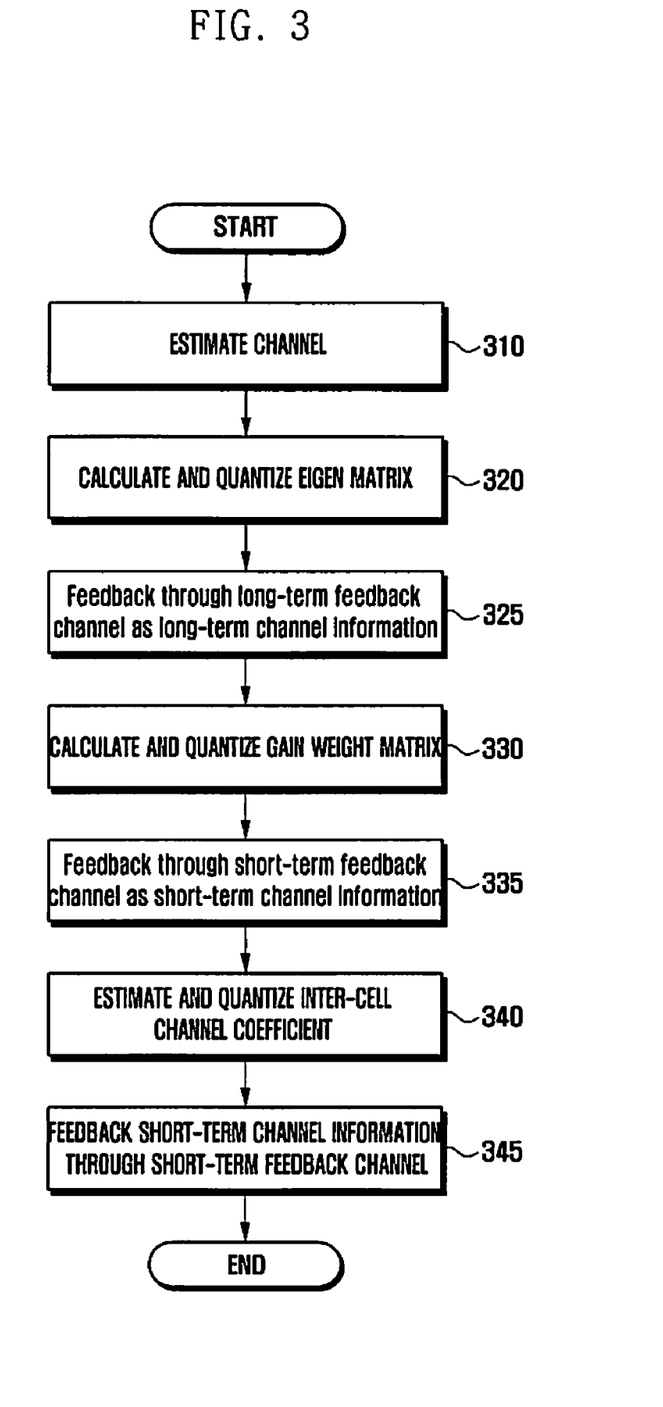
FIG. 3 is a flowchart illustrating a method for transmitting channel state information of a terminal according to an embodiment of the present invention.

FIG. 3 is a flowchart illustrating a method for transmitting channel state information of a terminal according to an embodiment of the present invention.

First, the AT 100 estimates a pilot channel received from neighboring C-BTSs 500 to estimate down link channels $\{H_m\}_{m=1,\ldots,M}$ from M C-BTSs 500 to a corresponding AT 100, respectively in Step 310. Further, the AT 100 estimates a down link MIMO network channel $H_{network}=[\sqrt{\gamma_1}H_1 \ \sqrt{\gamma_2}H_2 \ \sqrt{\gamma_3}H_3]$ from M C-BTSs 500 to the AT 100. Subsequently, the AT 100 calculates an eigen matrix $E_m$ of a corresponding down link channel $H_m$ using down link channel information $H_m$ from an m-th C-BTS 500 to the AT 100 among the estimated channels, and quantizes the eigen matrix $E_m$ to obtain a quantized matrix $\tilde{E}_m$ in Step 320. Subsequently, the AT 100 feedbacks LTEM feedback information $LTEM_m$ to the m-th C-BTS 500 through the long-term feedback channel in Step 325. The AT 100 may perform Step 320 and Step 325 for M C-BTSs 500, respectively. Here, the eigen matrix $E_m$ of the size $n_T \times n_T$ is obtained by eigen value decomposing (EVD) a long-term covariance matrix $E[H_m^H H_m]$ obtained by averaging covariance $H_m^H H_m$ for an enough long time. the larger a corresponding eigen value is, $n_T$ column vectors, namely, eigen vectors constituting $E_m$, are arranged at a left side. Accordingly, when $E_m = [e_{m,1} \ e_{m,2} \ldots e_{m,n_T}]$, a maximum eigen vector becomes $e_{m,1}$.

Next, the AT 100 multiplies down link channel information $H_m$ from an m-th C-BTS estimated in previous Step 310 to the AT 100 by Hermitain of an eigen matrix $\tilde{E}_m$, estimated and quantized at Step 320 as illustrated in the Equation (4) to calculate and quantize a gain weight matrix $F_m$ in Step 330. The $n_R \times n_T$ matrix $F_m$ is composed of $n_T$ column vectors $\{f_{m,n}\}_{n=1,\ldots,n_T}$ having the size $n_R \times 1$.

As illustrated earlier, after quantizing the $F_m$, the AT 100 can feedback it to the m-th C-BTS through a short-term feedback channel as short-term channel information in Step 335. Further, the AT 100 may perform Steps 330 and 335 for M C-BTSs.

The AT 100 estimates and quantizes an inter-cell channel coefficient in Step 340. The AT 100 constructs an inter-cell channel matrix $\{\tilde{H}_m\}_{m=1,\ldots,M}$ expressed by the Equation (8), and estimates an inter-cell channel coefficient compensating a channel difference between C-BTSs 500 to exactly imitate the estimated down link MIMO network channel $H_{network}=[\sqrt{\gamma_1}H_1 \ \sqrt{\gamma_2}H_2 \ \sqrt{\gamma_3}H_3]$ at Step 310 the most, and quantizes it to obtain $\{\chi_m\}_{m=1,\ldots,3}$.

The quantized channel matrix $\{\tilde{H}_m\}_{m=1,\ldots,M}$ can be obtained by a combination of a quantized value of $E_m$ and a quantized value of $F_m$. The inter-cell channel coefficient $\{\chi_m\}_{m=1,\ldots,3}$ is a value minimizing a distance between a MIMO network $\tilde{H}_{network}=[\chi_1\tilde{H}_1 \ \chi_2\tilde{H}_2 \ \chi_3\tilde{H}_3]$ composed of the quantized channel matrix $\{\tilde{H}_m\}_{m=1,\ldots,M}$ and a real down link MIMO network channel $H_{network}=[\sqrt{\gamma_1}H_1 \ \sqrt{\gamma_2}H_2 \ \sqrt{\gamma_3}H_3]$ estimated at Step 310. The AT 100 vector-quantizes vectors $c=[\chi_1 \ldots \chi_M]^T$ composed of the inter-cell channel coefficient $\{\chi_m\}_{m=1,\ldots,3}$.

The vector quantization is performed at Step 340 by designing the inter-cell channel vector code book $F_{inter}$ composed of vectors having the size $M \times 1$, and selecting a vector minimizing a distance $D(\tilde{H}_{network}, H_{network})$ between $H_{network}$ and $\tilde{H}_{network}$ from the inter-cell channel vector code book $F_{inter}$ as illustrated in the Equation (9).

Assuming that averages SNR $\{\gamma_m\}_{m=1,\ldots,M}$ from C-BTSs 500 performing cooperation communication to one AT 100 are similar to each other, vectors of the size $M \times 1$ constituting the inter-cell channel vector code book $F_{inter}$ should be designed to have isotropic distribution in an M-dimensional complex vector space. Accordingly, vectors of the size $M \times 1$ may use a code book designed in an existing RVQ scheme and a Grassmannian code book adapted to IEEE802.16e.

Subsequently, the AT 100 transmits values vector-quantized vectors $c=[\chi_1 \ldots \chi_M]^T$ composed of inter-cell channel coefficient $\{\chi_m\}_{m=1,\ldots,3}$ to a C-BTS 500 through a short-term feedback channel in an inter-cell vector index (ICVI) in Step 345.

Figure 4:
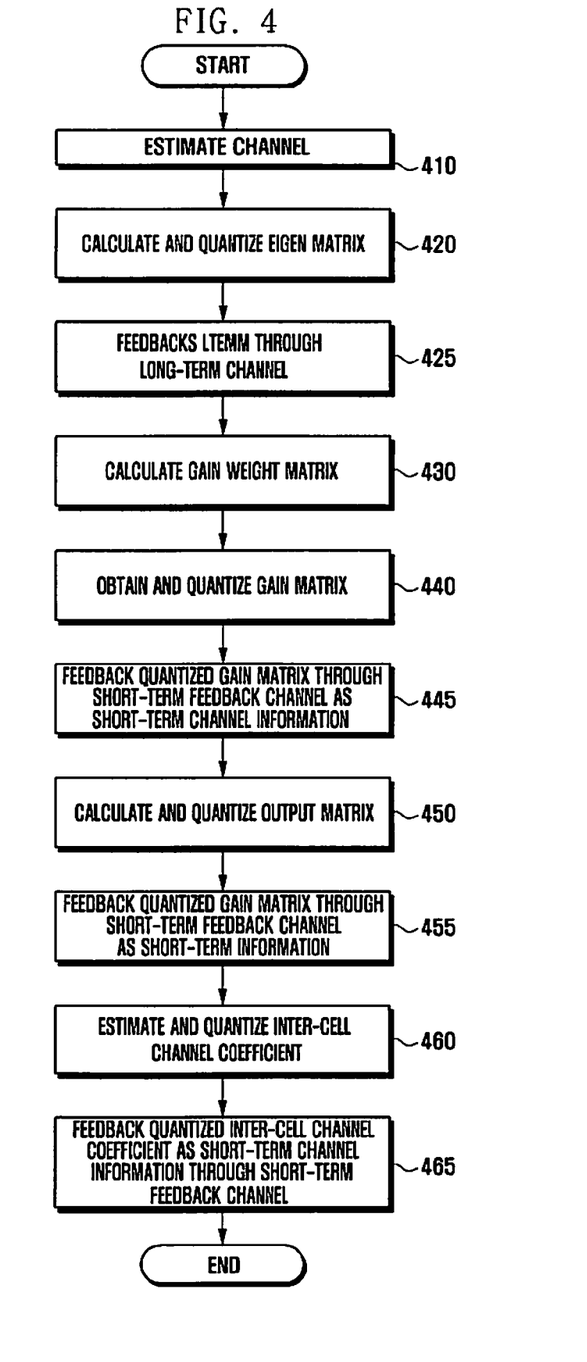
FIG. 4 is a flowchart illustrating a method for transmitting channel state information of a terminal according to an embodiment of the present invention.

FIG. 4 is a flowchart illustrating a method for transmitting channel state information of a terminal according to an embodiment of the present invention.

First, the AT 100 estimates a pilot channel received from neighboring C-BTSs 500 to estimate down link channels $\{H_m\}_{m=1,\ldots,M}$ from M C-BTSs 500 to a corresponding AT 100 in Step 410. Further, the AT 100 estimates down link MIMO network channel $H_{network}=[\sqrt{\gamma_1}H_1 \sqrt{\gamma_2}H_2 \sqrt{\gamma_3}H_3]$ from M C-BTSs 500 to a corresponding AT 100.

Subsequently, the AT 100 calculates an eigen matrix $E_m$ of a corresponding down link channel using down link channel information $H_m$ from an m-th C-BTS 500 to the AT 100 among the estimated channels, and quantizes it to obtain a matrix $\tilde{E}_m$ in Step 420. Next, the AT 100 feedbacks LTEM feedback information LTEM, to the m-th C-BTS 500 through a long-term channel in Step 425.

The AT 100 may perform Steps 420 and 425 for M C-BTSs 500. Here, the eigen matrix $E_m$ of the size $n_T \times n_T$ is obtained by eigen value decomposing (EVD) a long-term covariance matrix $E[H_m^H H_m]$ obtained by averaging covariance $H_m^H H_m$ for an enough long time. the larger a corresponding eigen value is, $n_T$ column vectors, namely, eigen vectors constituting $E_m$, are arranged at a left side. Accordingly, when $E_m = [e_{m,1}\ e_{m,2}\ \ldots\ e_{m,n_T}]$, a maximum eigen vector becomes $e_{m,1}$.

Next, the AT 100 multiplies down link channel information $H_m$ from an m-th C-BTS 500 to the AT 100 estimated at Step 410 by Hermitain of an eigen $\tilde{E}_m$ estimated and quantized at Step 420 to calculate and quantize a gain weight matrix $F_m$ in Step 430.

An $n_R \times n_T$ matrix $F_m$ is composed of $n_T$ column vectors $\{f_{m,n}\}_{n=1,\ldots,n_T}$ of the size $n_R \times 1$.

Subsequently, the AT 100 calculates and quantizes a gain matrix $D_m$ from the gain weight matrix $F_m$ in Step 440. That is, the AT 100 calculates a norm of $n_T$ column vectors of the gain weight matrix $F_m$ obtained at Step 430, namely, $\{\|f_{m,n}\|\}_{n=1,\ldots,n_T}$. This means a gain matrix $D_m$. Further, the AT 100 compares $\{\|f_{m,n}\|\}_{n=1,\ldots,n_T}$ with a reference value $R_{th}$. The AT 100 scalar-quantizes R values, namely, $\{\|f_{m,n}\|\}_{n=1,\ldots,R}$ greater than $R_{th}$.

Subsequently, the AT 100 transmits the quantized gain matrix to a short-term feedback channel in Step 445. That is, the AT 100 feedbacks an index of R quantized scalar values to an m-th C-BTSs 500 through a short-term feedback channel as R SGI feedback information $\{SGI_{m,n}\}_{n=1,\ldots,R}$. The scalar quantization is performed at Step 440 by designing a scalar code book $F_{scalar}$ composed of plural scalar values, and selecting a scalar value minimizing a distance between $\{\|f_{m,n}\|\}_{n=1,\ldots,R}$ as illustrated in the Equation (5) from the $F_{scalar}$.

The scalar code book $F_{scalar}$ is designed by non-uniform quantization in consideration of distribution of $\{\|f_{m,n}\|\}_{n=1,\ldots,R}$ according to the number of transmission and reception antennas and a channel environment.

A quantized scalar value indicated by a feedback $\{SGI_{m,n}\}_{n=1,\ldots,R}$ is R diagonal components constituting a gain matrix $D_m$ of the Equation (2). The AT 100 may perform Steps 440 and 445 for M C-BTSs 500.

Next, the AT 100 calculates and quantizes an output matrix $W_m$ from a gain weight matrix $F_m$ in Step 450. Namely, the AT 100 normalizes R column vectors $\{\|f_{m,n}\|\}_{n=1,\ldots,R}$ of the matrix $F_m$ obtain at Step 430 as illustrated in the Equation (6) to calculate an output matrix $W_m$. Subsequently, that is, the AT 100 vector-quantizes R normalized vectors $\{\|\hat{f}_{m,n}\|\}_{n=1,\ldots,R}$. Next, the AT 100 feedbacks R Output Vector Index (OVI) feedback information $\{OVI_{m,n}\}_{n=1,\ldots,R}$ to an m-th C-BTSs 500 through a short-term feedback channel in Step 455.

A quantized vector value indicated by a feedback $\{OVI_{m,n}\}_{n=1,\ldots,R}$ represents R column vectors constituting an output matrix $W_m$ of the Equation (2). The AT 100 may perform Steps 450 and 455 for M C-BTSs 500. The vector quantization is performed at Step 450 by designing the vector code book $F_{inter}$ composed of vectors having the size $n_R \times 1$, and selecting a vector $\{\|\hat{f}_{m,n}\|\}_{n=1,\ldots,R}$ minimizing a distance $D(w,\hat{f}_{m,n})$ between $\{\|f_{m,n}\|\}_{n=1,\ldots,R}$, namely, exactly imitating $\{\|f_{m,n}\|\}_{n=1,\ldots,R}$ from $F_{inter}$ as illustrated in the Equation (7).

Vectors of the size $n_R \times 1$ constituting a vector code book $F_{intra}$ should be designed to have isotropic distribution in an $n_R$-dimensional complex vector space. Accordingly, the vectors of the size $n_R \times 1$ may use a code book designed by an existing Random Vector Quantization (RVQ) scheme or a code book Grassmannian adapted to IEEE802.16e.

The AT 100 estimates and quantizes an inter-cell channel coefficient in Step 460. At Step 460, the AT 100 constructs a channel matrix $\{\tilde{H}_m\}_{m=1,\ldots,M}$, and estimates an inter-cell channel coefficient compensating for a channel difference between C-BTSs 500 to exactly imitate the estimated down link MIMO network channel $H_{network}=[\sqrt{\gamma_1}H_1 \sqrt{\gamma_2}H_2 \sqrt{\gamma_3}H_3]$ at Step 410 the most, and quantizes it to obtain $\{\chi_m\}_{m=1,\ldots,3}$.

The quantized channel matrix $\{\tilde{H}_m\}_{m=1,\ldots,M}$ can be constructed by combining $\tilde{E}_m$ obtained at Step 430, $\tilde{D}_m$ obtained at Step 440, and $\tilde{W}_m$ obtained at Step 450 as illustrated in the Equation (8).

The inter-cell channel coefficient $\{\chi_m\}_{m=1,\ldots,3}$ is a value minimizing a distance between a MIMO network channel $\tilde{H}_{network}=[\chi_1 \tilde{H}_1\ \chi_2 \tilde{H}_2\ \chi_3 \tilde{H}_3]$ composed of the quantized channel matrix $\{\tilde{H}_m\}_{m=1,\ldots,M}$ and a real down link MIMO network channel $H_{network}[\sqrt{\gamma_1}H_1 \sqrt{\gamma_2}H_2 \sqrt{\gamma_3}H_3]$ estimated at Step 410. The AT 100 vector-quantizes a vector $c=[\chi_1 \ldots \chi_M]^T$ composed of the inter-cell channel coefficient $\{\chi_m\}_{m=1,\ldots,3}$.

The vector quantization is performed at Step 460 by designing the inter-cell vector code book $F_{inter}$ composed of vectors having the size $M \times 1$, and selecting a vector minimizing a distance $D(\tilde{H}_{network}, H_{network})$ between $H_{network}$ and $\tilde{H}_{network}$ from the inter-cell channel vector code book $F_{inter}$ as illustrated in the Equation (9).

Assuming that averages SNR $\{\gamma_m\}_{m=1,\ldots,M}$ from C-BTSs 500 performing cooperation communication to one AT 100 are similar to each other, vectors of the size $M \times 1$ constituting the inter-cell channel vector code book $F_{inter}$ should be designed to have isotropic distribution in an M-dimensional complex vector space. Accordingly, vectors of the size $M \times 1$ may use a code book designed in an existing RVQ scheme and a Grassmannian code book adapted to IEEE802.16e.

Subsequently, the AT 100 transmits values vector-quantized vectors $c=[\chi_1 \ldots \chi_M]^T$ composed of inter-cell channel coefficient $\{\chi_m\}_{m=1,\ldots,3}$ to a C-BTS 500 through a short-term feedback channel in an Inter-Cell Vector Index (ICVI) in Step 465.

Figure 5:
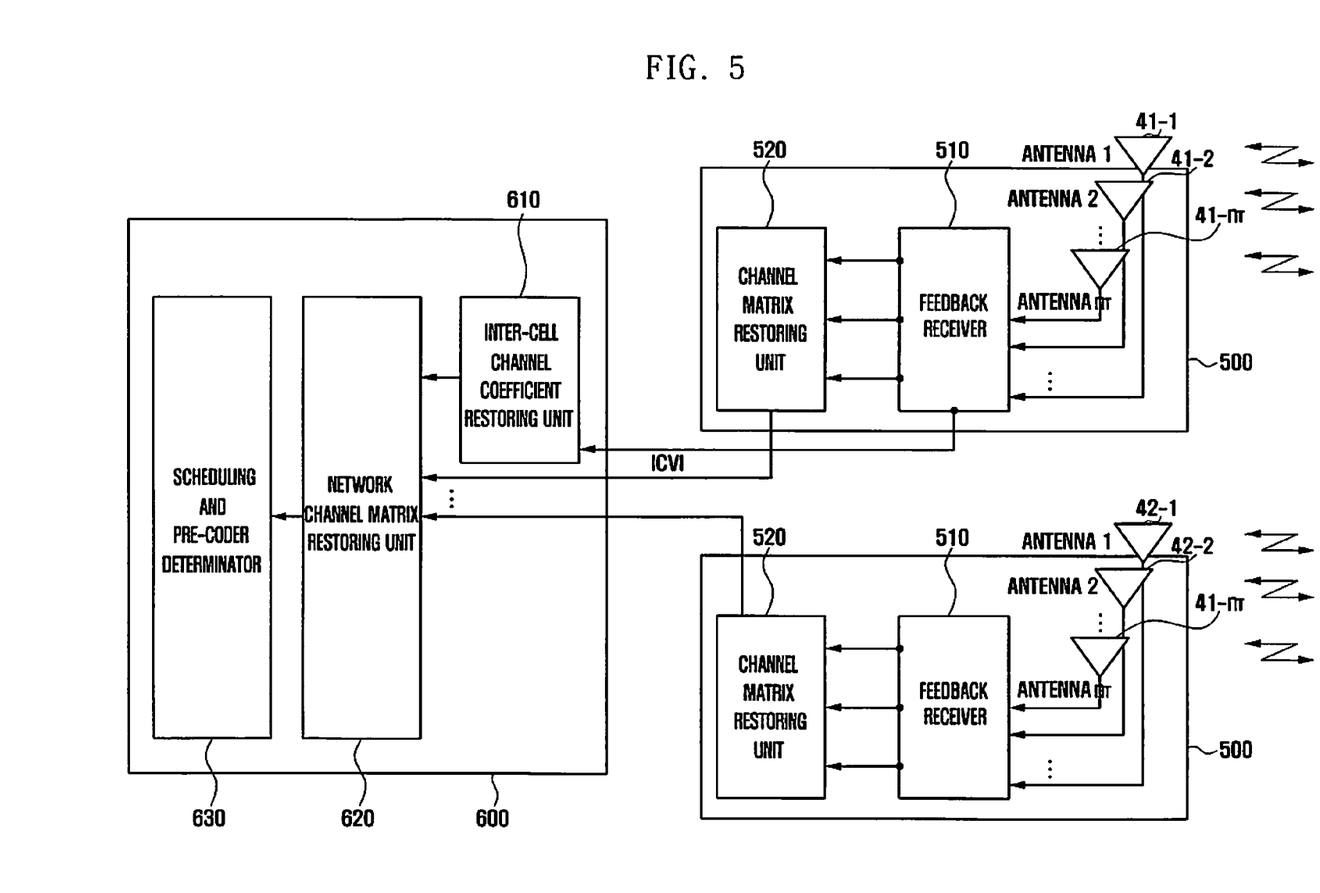
FIG. 5, FIG. 6A, and FIG. 6B are diagrams illustrating an apparatus for receiving transmitter channel state information according to an embodiment of the present invention.
Figure 6A:
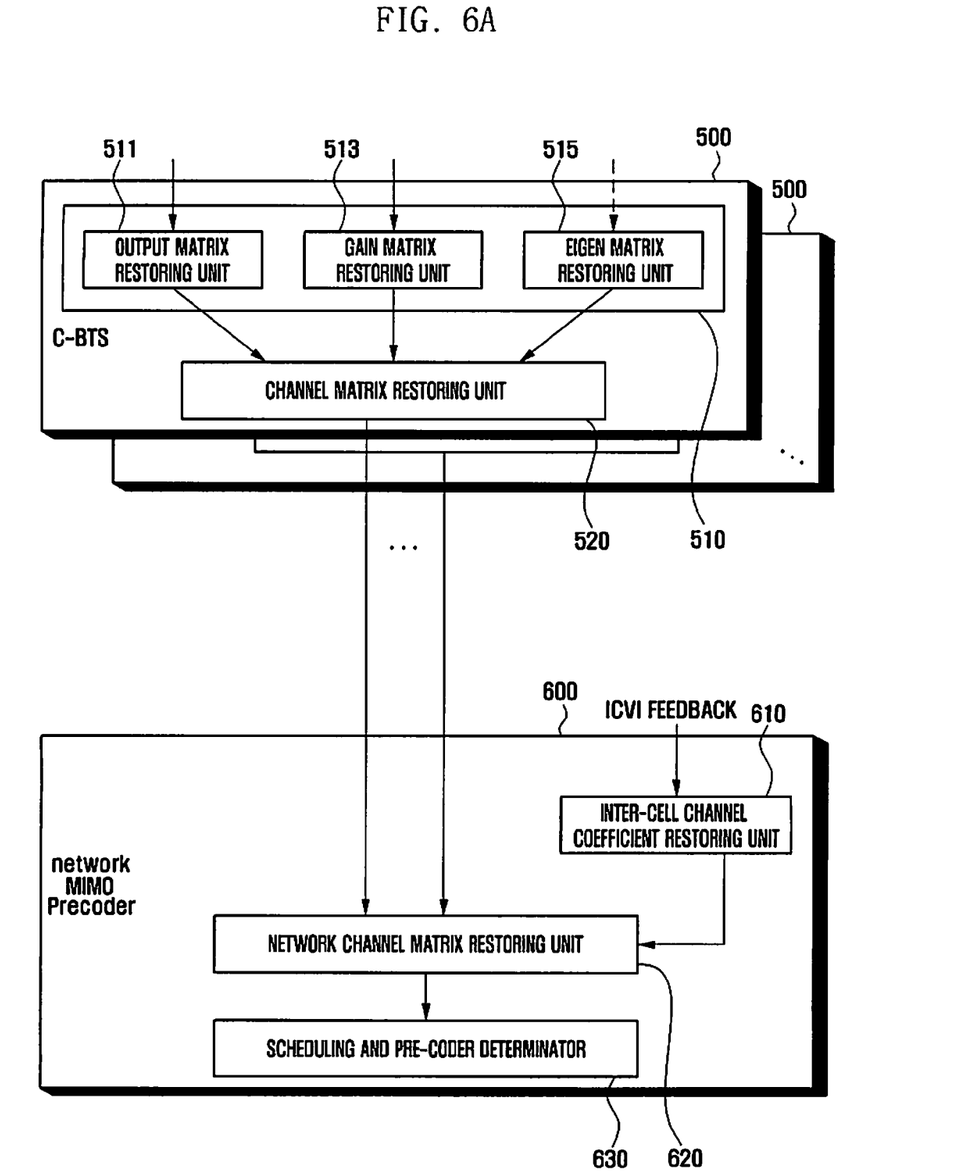
Figure 6B:
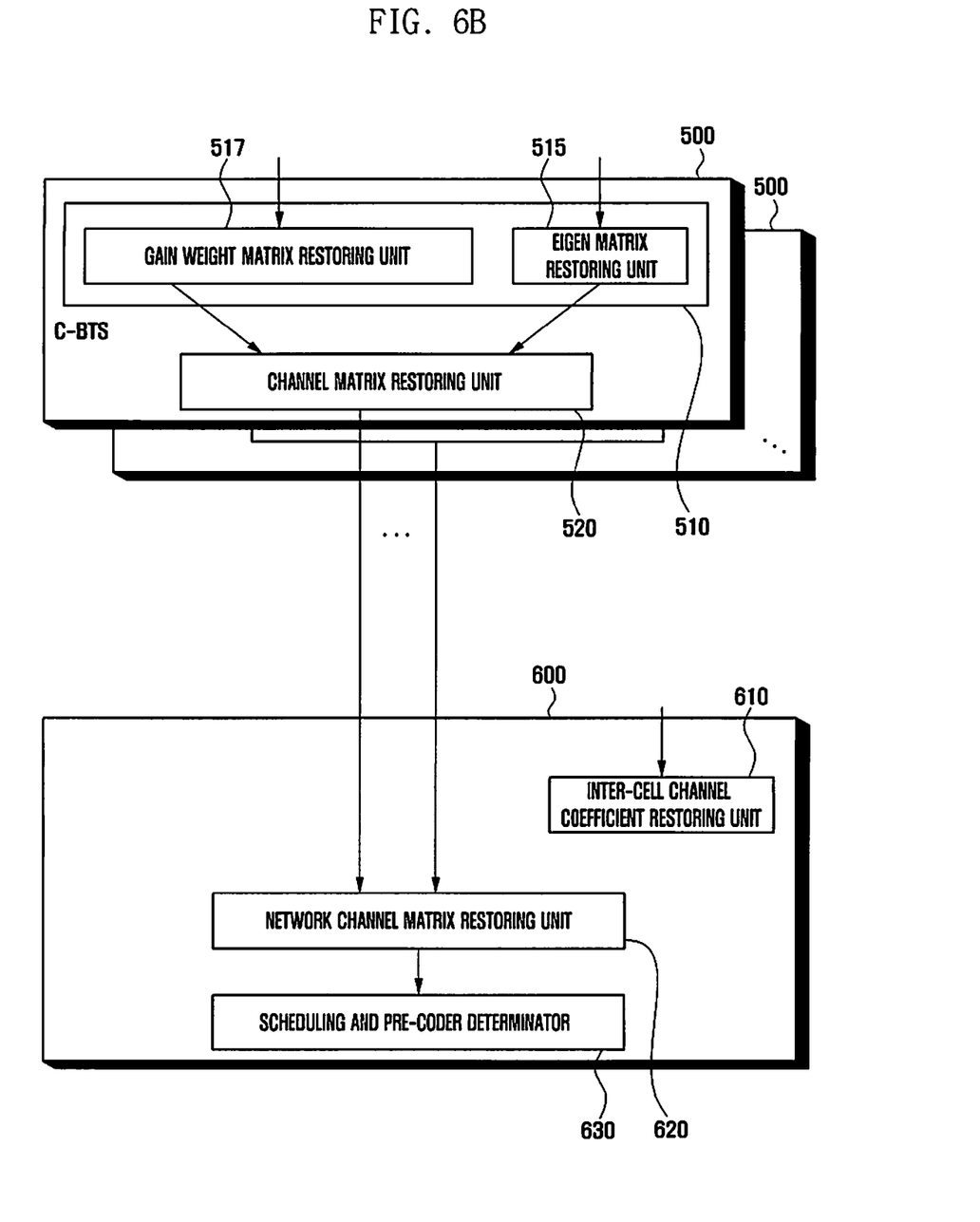

FIG. 5, FIG. 6A, and FIG. 6B are diagrams illustrating an apparatus for receiving transmitter channel state information according to an embodiment of the present invention.

Referring to FIG. 5, FIG. 6A, and FIG. 6B, a control channel information receiver of a MIMO network system of the present invention includes a plurality of C-BTSs 500 and a MIMO network pre-coder (referred to as 'pre-coder') 600.

The C-BTSs 500 include a plurality of antennas 41-1 to 41-$n_R$, 42-1 to 42-$n_R$ for MIMO type transmission/reception. Each C-BTS 500 includes a feedback receiver 510 and a channel matrix restoring unit 520. Further, the feedback receiver 510 includes an output matrix restoring unit 511, a gain matrix restoring unit 513, and an eigen matrix restoring unit 515. In another embodiment of the present invention, a feedback receiver 510 includes a gain weight matrix restoring unit 517 instead of the output matrix restoring unit 511 and the gain matrix restoring unit 513.

The pre-coder 600 includes an inter-cell channel coefficient restoring unit 610, a network channel matrix restoring unit 620, and a scheduling and pre-coder determinator 630.

When the AT 100 transmits channel state information as illustrated in FIG. 4, the feedback receiver 510 includes an output matrix restoring unit 511, a gain matrix restoring unit 513, and an eigen matrix restoring unit 515 as shown in FIG. 6a, which is operated as follows. The feedback receiver 510 of each C-BTS 500 decodes received $\{OVI_{m,n}\}_{n=1,\ldots,R}$, and restores an output matrix $\tilde{W}_m$ as illustrate in a following Equation (10) using vectors indicated in $F_{intra}$ by R vector indexes. This is achieved by an output matrix restoring unit 511.

$$\tilde{W}_m = [\tilde{w}_{m,1} \ldots \tilde{w}_{m,R} 0 \ldots 0] \quad (10)$$

A feedback receiver 510 of each C-BTS 500 decodes received $\{SVI_{m,n}\}_{n=1,\ldots,R}$, and restores a gain matrix $\tilde{D}_m$ of a diagonal matrix pattern as illustrated in a following Equation (11) using scalar values indicated in $F_{scalar}$ by R indexes. This is achieved by the gain matrix restoring unit 513.

$$\tilde{D}_m = \mathrm{diag}\{\tilde{d}_{m,1}, \ldots, \tilde{d}_{m,R}, 0, \ldots, 0\} \quad (11)$$

A feedback receiver 510 of each C-BTS 500 decodes a received $LTEM_m$, and restores an eigen matrix $\tilde{E}_m$. This is achieved by an eigen matrix restoring unit 515.

When the AT 100 transmits channel state information as illustrate in FIG. 3, the feedback receiver 510 includes a gain weight matrix restoring unit 517 and an eigen matrix restoring unit 515 as illustrated in FIG. 6B, which is operated as follows.

A feedback receiver 510 of each C-BTS 500 restores a matrix $\tilde{F}_m$ achieved by quantizing a received $F_m$. This is achieved by a gain weight matrix restoring unit 517.

Moreover, a feedback receiver 510 of each C-BTS 500 decodes a received $LTEM_m$ to restore an eigen matrix $\tilde{E}_m$. This is achieved by an eigen matrix restoring unit 515. An inter-cell channel matrix restoring unit 520 of each C-BTS 500 combines $\tilde{W}_m$, $\tilde{D}_m$, and $\tilde{E}_m$ restored by the feedback receiver 510 or restored $\tilde{E}_m$ and $\tilde{F}_m$ restored by the feedback receiver 510. Subsequently, a channel matrix restoring unit 520 of each C-BTS 500 restores a quantized inter-cell channel matrix as illustrated in a following Equation (12).

$$\tilde{H}_m = \tilde{W}_m \tilde{D}_m \tilde{E}_m^H$$

$$\tilde{H}_m = \tilde{F}_m \tilde{E}_m^H \quad (12)$$

An inter-cell channel coefficient restoring unit 610 decodes a received ICVI, and restores $\{\chi_m\}_{m=1,\ldots,M}$ being an inter-cell channel coefficient by referring a vector indicated in a vector code book $F_{inter}$ by an index.

The network channel matrix restoring unit 620 constructs quantized channel matrixes $\{\tilde{H}_m\}_{m=1,\ldots,M}$ and a restored inter-cell channel coefficient $\{\chi_m\}_{m=1,\ldots,M}$ as illustrated in a following Equation (13) to restore a MIMO network channel.

$$\tilde{H}_{network} = [\chi_1 \tilde{H}_1 \ldots \chi_M \tilde{H}_M] \quad (13)$$

Here, quantized channel matrixes $\{\tilde{H}_m\}_{m=1,\ldots,M}$ are restored by C-BTSs 500 and transferred to a network channel matrix restoring unit 620 through backhaul. Further, the network channel matrix restoring unit 620 receives a restored inter-cell channel coefficient $\{\chi_m\}_{m=1,\ldots,M}$ from the inter-cell channel coefficient restoring unit 610.

The scheduling and pre-coder determinator 630 schedules using restored MIMO network channel information according to each AT 500. Further, the scheduling and pre-coder determinator 630 determines a pre-coding matrix according to scheduling, and calculates and determines a transmission possible capacity.

Figure 7:
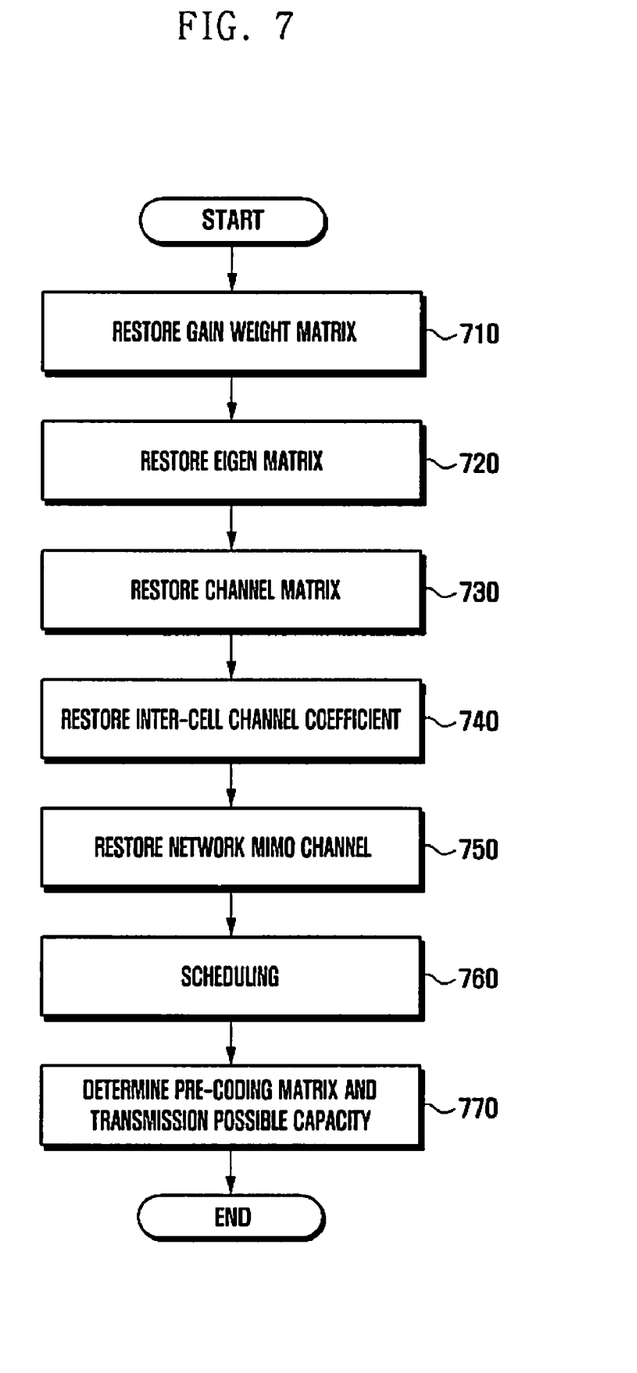
FIG. 7 is a flowchart illustrating a method for receiving channel state information of a network according to an embodiment of the present invention.

FIG. 7 is a flowchart illustrating a method for receiving channel state information of a network according to an embodiment of the present invention.

Referring to FIG. 7, a feedback receiver of each C-BTS 500 restores a matrix $\tilde{F}_m$ obtained by quantizing a received $F_m$ in Step 710. This is achieved by a gain weight matrix restoring unit 517.

Next, a feedback receiver 510 of each C-BTS 500 decodes a received $LTEM_m$ to restored an eigen matrix $\tilde{E}_m$ in Step 720. This is achieved by an eigen matrix restoring unit 515.

Subsequently, a channel matrix restoring unit 520 of each C-BTS 500 combines $\tilde{E}_m$ 및 $\tilde{F}_m$ restored by the feedback receiver 510 to restore a quantized channel matrix as illustrated in the Equation (12) in Step 730.

After decoding a received ICVI, an inter-cell channel coefficient restoring unit 610 restores an inter-cell channel coefficient $\{\chi_m\}_{m=1,\ldots,M}$ by referring a vector in a vector code book $F_{inter}$ indicated by the index in Step 740.

A network channel matrix restoring unit 620 restores a MIMO network channel in Step 750. The MIMO network channel may be restored by a combination of quantized channel matrixes $\{\tilde{H}_m\}_{m=1,\ldots,M}$ and a restored inter-cell channel coefficient $\{\chi_m\}_{m=1,\ldots,M}$ as illustrated in the Equation (13).

The quantized channel matrixes $\{\tilde{H}_m\}_{m=1,\ldots,M}$ are restored by C-BTSs 500, and the network channel matrix restoring unit 620 receives them by backhaul. The network channel matrix restoring unit 620 receives the inter-cell channel coefficient $\{\chi_m\}_{m=1,\ldots,M}$ from the inter-cell channel coefficient restoring unit 610.

A scheduling and pre-coder determinator 630 schedules using MIMO network channel information restored by ATs 100 in Step 760. Next, the scheduling and pre-coder determinator 630 determines a pre-coding matrix according to the scheduling, and calculates and determines a transmission possible capacity in Step 770.

Figure 8:
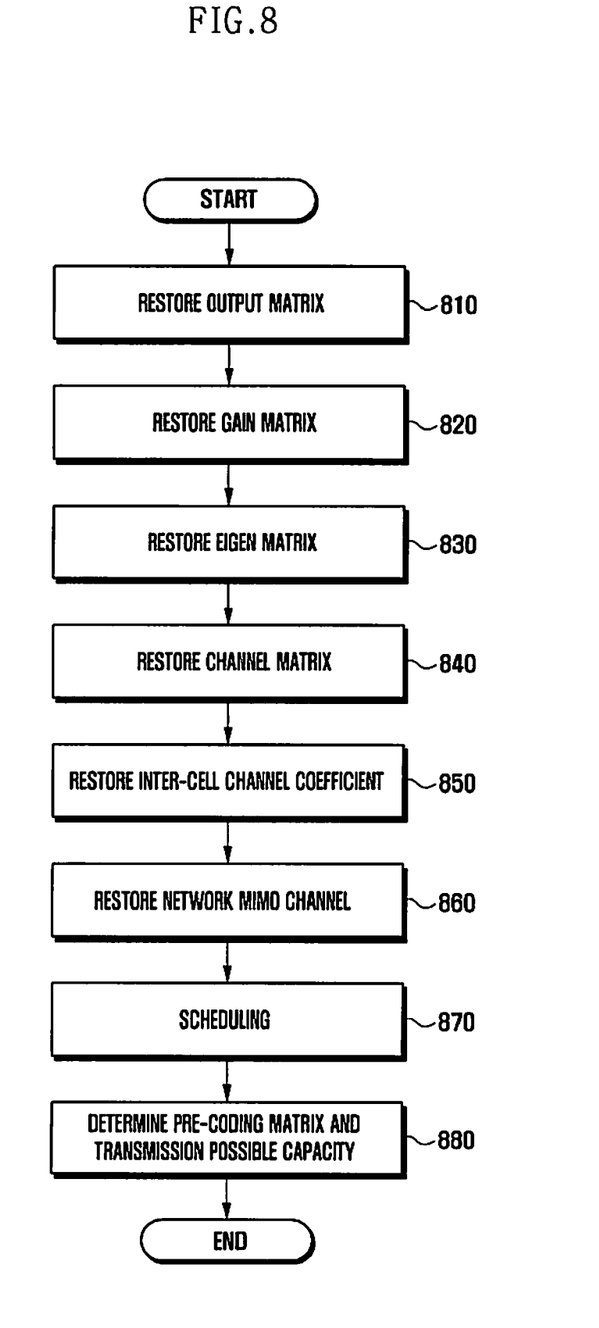
FIG. 8 is a flowchart illustrating a method for receiving channel state information of a network according to an embodiment of the present invention.

FIG. 8 is a flowchart illustrating a method for receiving channel state information of a network according to an embodiment of the present invention.

Referring to FIG. 8, after decoding a received $\{OVI_{m,n}\}_{n=1,\ldots,R}$, a feedback receiver 510 of each C-BTS restores an output matrix $\tilde{W}_m$ using vectors in $F_{intra}$ indicated by R vector indexes as illustrated in the Equation (10) in Step 810. This is achieved by an output matrix restoring unit 511.

A feedback receiver 510 of each C-BTS 500 decodes a received $\{SVI_{m,n}\}_{n=1,\ldots,R}$, and restores a gain matrix of a diagonal matrix pattern $\tilde{D}_m$ using scalar values in $F_{scalar}$ indicated by R indexes as illustrated in the Equation (11) in Step 820. This is achieved by a gain matrix restoring unit 513.

A feedback receiver 510 decodes a received $LTEM_m$ by C-BTSs 500 to restore an eigen matrix $\tilde{E}_m$ in Step 830. This is achieved by an eigen matrix restoring unit 515.

A channel matrix restoring unit 520 of each C-BTS 500 combines $\tilde{W}_m$, $\tilde{D}_m$, and $\tilde{E}_m$ restored by the feedback receiver 510 to restore a quantized channel matrix as illustrated in the Equation (12) in Step 840.

The inter-cell channel coefficient restoring unit 610 decodes a received ICVI, and restores an inter-cell channel coefficient $\{\chi_m\}_{m=1,\ldots,M}$ by referring a vector in a vector code book $F_{inter}$ indicated by an index in Step 850.

A network channel matrix restoring unit 620 constructs quantized channel matrixes $\{\tilde{H}_m\}_{m=1,\ldots,M}$ and a restored inter-cell channel coefficient $\{\chi_m\}_{m=1,\ldots,M}$ as illustrated in the Equation (13) to restore a MIMO network channel in Step 860. The quantized channel matrixes $\{\tilde{H}_m\}_{m=1,\ldots,M}$ are restored by C-BTSs 500, and a network channel matrix restoring unit 620 receives them through backhaul. The network channel matrix restoring unit 620 receives the inter-cell channel coefficient $\{\chi_m\}_{m=1,\ldots,M}$ from the inter-cell channel coefficient restoring unit 610.

A scheduling and pre-coder determinator 630 schedules using MIMO network channel information restored by ATs 100 in Step 870. Next, the scheduling and pre-coder determinator 630 determines a pre-coding matrix according to scheduling, and calculates and determines a transmission possible capacity in Step 880.

The present invention provides hybrid feedback technology for efficiently combining limited amounts of long-term feedback information and short-term feedback information to transmit complete CSI to a transmitter in a MIMO network antenna system. To analyze the performance of the provided hybrid feedback technology, the performance a direct quantization based feedback scheme transferring complete CSI and the performance of a Singular Value Decomposition (SVD) quantization based feedback scheme are compared and analyzed based on a capacity of a Spatial Multiplexing (SM) system. It is assume that the number $n_T$ of transmission antennas in a considered SM system is four, an antenna interval is $0.5\lambda$, the number $n_R$ of reception antennas is two, and there is no space correlation between reception antennas. The following is an SM system using hybrid feedback technology implemented on simulation. The AT 100 estimates an inter-cell down link channel $H_m$ from a BTS 500, and feedbacks quantized feedbacks complete CSI $\tilde{H}_m$ to a BTS using the provided hybrid feedback technology. It is assume that long-term feedback information $E_m$ is transferred to a BTS without a quantization error or a transmission error. R diagonal components $\{d_{m,n}\}_{n=1,\ldots,r}$ of a gain matrix $D_m$ are quantized to 5 bits, and r 2×1 column vectors of an output matrix $W_m$ are vector-quantized using a 3 bit 2×1 vector coder book of IEEE 802.16e.

A transmitter SVDs feedback complete CSI $\tilde{H}_m$ to calculate a right singular matrix $\tilde{V}_m$ and a diagonal matrix $\tilde{\Lambda}_m$ composed of diagonal components or singular values. An optimal power allocation matrix $\tilde{P}_m$ is determined by a water-filling algorithm based on an average received SNR $\rho$ and obtained singular values, and pre-codes a real channel matrix $H_m$ using pre-coding matrix $\tilde{F}_m = \tilde{V}_m \tilde{P}_m$ to transmit data. At this time, a channel capacity of a pre-coded channel matrix $H_m \tilde{F}_m$ is expressed by a following Equation (14).

$$:C(H_m\tilde{F}_m,\rho)=\log_2 \det(I_{n_R}+\rho H_m\tilde{F}_m\tilde{F}_m^H H_m^H) \qquad (14)$$

An operation of an SM system using direct quantization based feedback technology and SVD quantization based feedback technology is the same as that of an SM system using hybrid feedback technology. However, there is a difference in quantization and feedback technologies used upon feedback quantized complete CSI $\tilde{H}_m$ to a base station. The direct quantization based feedback technology quantizes a norm of $n_T n_R \times 1$ column vectors, namely, $\{\|h_{m,n}\|\}_{n=1,\ldots,n_T}$ constituting an inter-cell down link channel matrix $H_m$ to 5 bits, and $n_T$ quantized $n_R \times 1$ column vectors $\{h_{m,n}/\|h_{m,n}\|\}_{n=1,\ldots,n_T}$ are vector-quantized using 3 bit 2×1 code book of IEEE 802.16e. The SVD quantization based feedback technology SVDs an inter-cell down link channel matrix $H_m$ to $H_m = U_m L_m V_m^H$ to, and quantizes $U_m$ and $V_m$ using a 3 bit 2×2 unitary matrix code book and a 3 bit 4×4 unitary matrix code book of IEEE 802.16e. Further, the SVD quantization based feedback technology quantizes $\min(n_R, n_T)$ singular values constituting $\Lambda_m$ to 5 bits.

Figure 9:
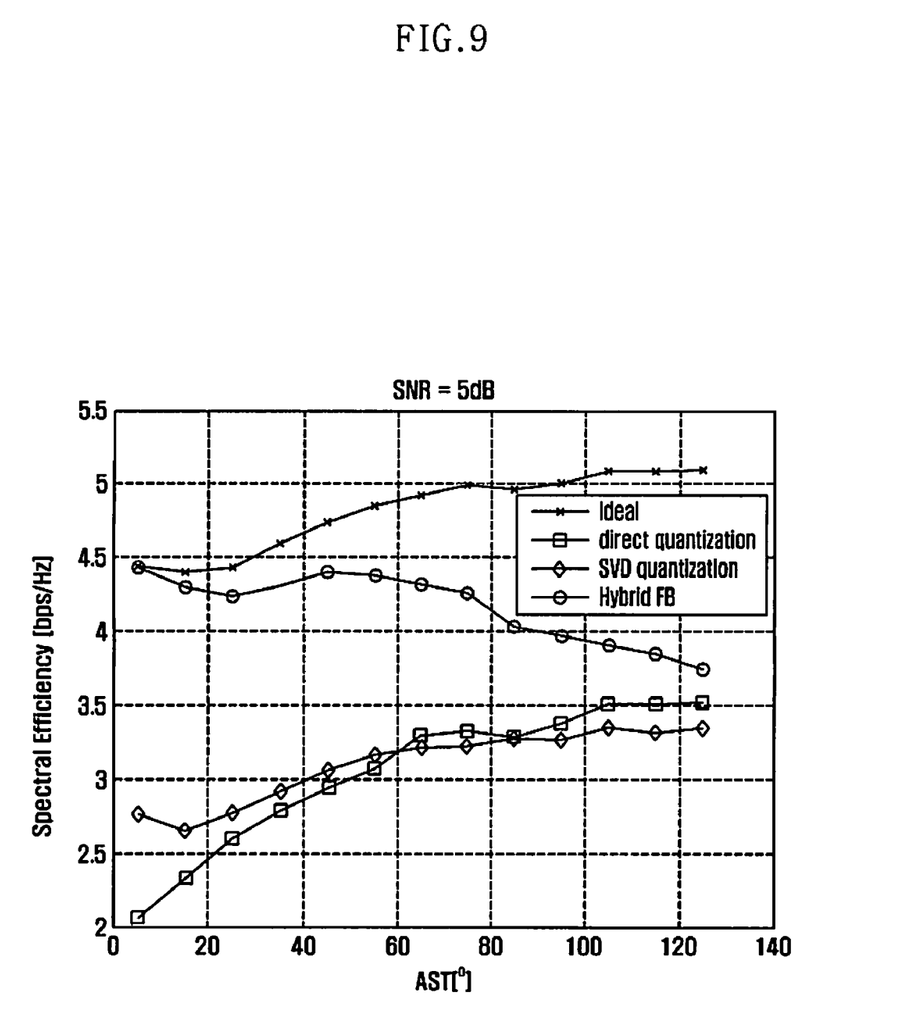
FIG. 9 is a graph comparing transmission capacities of an SM system according to full CSI feedback technology.

FIG. 9 is a graph comparing transmission capacities of an SM system according to complete CSI feedback technology.

A graph of FIG. 9 is channel CSI feedback technology, which indicates an ideal method transmitting a channel matrix of a non-quantized complete down link channel, a direct quantization directly quantizing and transmitting a channel matrix, an SVD quantization SVD quantizing a channel matrix, and a hybrid FB according to an embodiment of the present invention.

The ideal method indicates an upper bound capacity as a transmission capacity of an SM achievable using non-quantized complete down link channel information $H_m$. The direct quantization uses an instantaneous feedback information amount of 32 bits/frame, the SVD quantization uses an instantaneous feedback information amount of 16 bits/frame, and the provided hybrid feedback technology uses an instantaneous feedback information amount less than 16 bits/frame.

As illustrated, the provided hybrid feedback technology provides a maximum SM capacity using the lowest feedback information amount in various space correlation environment. Specifically, the provided hybrid feedback technology provides a capacity of upper bound in an Angular Spread at Transmitter (AST) range of a general mobile communication environment, namely, ASTs≦15°. It can be appreciated that hybrid feedback technology provided through this transmits complete CSI to a transmitter using minimum short-term feedback information in a general mobile communication environment.

As illustrated previously, the present invention provides hybrid feedback technology that efficiently combines limited amounts of long-term feedback information and short-term feedback information to transmit complete CSI to a MIMO network transmitter.

The hybrid feedback technology provided by the present invention divides and quantizes a down link MIMO channel matrix into a long-term eigen matrix which does not instantaneously change, a short-term gain matrix which instantaneously changes, and an output matrix to transfer complete CSI to a transmitter using minimum short-term feedback information.

As described earlier, layered feedback technology for a MIMO network system according to the present invention may feedback complete CSI regarding an inter-cell down link channel matrix feedback by C-BTSs 500 and inter-cell channel coefficient information compensating a channel difference between C-BTSs 500 to simultaneously use singular cell MIMO technology and MIMO network technology.

As illustrated previously, feedback technology of complete CSI for a down link MIMO network channel matrix according to the present invention enables a pre-coder 600 to calculate various MIMO technology combinations and a receiving possible SINR of ATs 100 with respect to a pre-coding matrix, and simultaneously optimize ATs 100 transmitting data and MIMO technology combination and pre-coding matrix to be used by corresponding ATs 100 based on it.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for sending channel state information of a terminal in a network Multiple-Input Multiple Output (MIMO) system having a plurality of base stations and the terminal, comprising:
    estimating a down link channel from a signal received from the base station;
    extracting long-term channel information from the extracted down link channel being in a state of a down link channel which does not instantaneously change every frame and sending the long-term channel information through a long-term feedback channel divided and allocated into plural frames; and extracting short-term channel information from the extracted down link channel being a state of a down link channel instantaneously changes every frame and sending the short-term channel information through a short-term feedback channel allocated every frame.

2. The method of claim 1, wherein the long-term channel information includes an eigen matrix obtained by accumulating covariance of a channel matrix indicating the estimated down link channel.

3. The method of claim 1, wherein the long-term channel information includes a value obtained by multiplying the channel matrix by Hermitain of the eigen matrix.

4. The method of claim 1, further estimating an inter-cell channel coefficient being a compensated value of a channel difference between the plurality of base stations from the estimated channel and sending the estimated inter-cell channel coefficient through the short-term feedback channel.

5. A method for receiving channel state information of a network in a network Multiple-Input Multiple Output (MIMO) system having a plurality of base stations and the terminal, comprising:

receiving long-term channel information being a state of a down link channel instantaneously not change every frame through a long-term feedback channel allocated through a plurality of frames by one of the plurality of base stations;

receiving short-term channel information being a state of a down link channel instantaneously changes every frame to which a short-term feedback channel is allocated by the one base station; and combining the long-term channel information and the short-term channel information by the one base station to restore a channel matrix indicating a down link channel between the base station and the terminal.

6. The method of claim 5, wherein the long-term channel information includes an eigen matrix obtained by accumulating covariance of a channel matrix indicating the estimated down link channel.

7. The method of claim 5, wherein the short-term channel information includes a value obtained by multiplying the channel matrix by Hermitain of the eigen matrix.

8. The method of claim 5, further comprising:

receiving an inter-cell channel coefficient being a compensated value of a channel difference between the plurality of base stations through the short-term feedback channel by a pre-coder; and restoring a MIMO network channel indicating a down link channel between the plurality of base stations and the terminal using the channel matrix and the inter-cell channel coefficient.

9. An apparatus for sending channel state information of a terminal in a network Multiple-Input Multiple Output (MIMO) system having a plurality of base stations and the terminal, comprising:

a transceiver performing data transmission and reception to and from the base station;

a channel estimator estimating a down link channel from a signal received from the base station;

a long-term channel information processor extracting long-term channel information from the extracted down link channel being a state of a down link channel not instantaneously change every frame and sending the long-term channel information through a long-term feedback channel divided and allocated into plural frames using the transceiver; and a short-term channel information processor extracting short-term channel information from the extracted down link channel being a state of a down link channel instantaneously changes every frame and sending the short-term channel information through a short-term feedback channel allocated every frame using the transceiver.

10. The apparatus of claim 9, wherein the long-term channel information includes an eigen matrix obtained by accumulating covariance of a channel matrix indicating the estimated down link channel.

11. The method of claim 9, wherein the short-term channel information includes a value obtained by multiplying the channel matrix by Hermitain of the eigen matrix.

12. The apparatus of claim 9, further a channel coefficient processor estimating an inter-cell channel coefficient being a compensated value of a channel difference between the plurality of base stations and sending the estimated inter-cell channel coefficient to the short-term feedback channel through the transceiver.

13. An apparatus for receiving channel state information of a network in a network Multiple-Input Multiple Output (MIMO) system having a plurality of base stations and the terminal, comprising:

a feedback receiver of one of the plurality of base stations receiving and restoring long-term channel information being a state of a down link channel not instantaneously change every frame through a long-term feedback channel allocated through a plurality of frames, and receiving and restoring short-term channel information being a state of a down link channel instantaneously changes every frame through a short-term feedback channel allocated every frame; and a channel matrix restoring unit of the one base station combining the long-term channel information and the short-term channel information to restore a channel matrix indicating a down link channel between the base station and the terminal.

14. The apparatus of claim 13, wherein the long-term channel information includes an eigen matrix obtained by accumulating covariance of a channel matrix indicating the estimated down link channel.

15. The apparatus of claim 13, wherein the short-term channel information includes a value obtained by multiplying the channel matrix by Hermitain of the eigen matrix.

16. The apparatus of claim 13, further comprising:

an inter-cell channel coefficient restoring unit receiving an inter-cell channel coefficient being a compensated value of a channel difference between the plurality of base stations; and a network channel matrix restoring unit restoring a MIMO network channel indicating a down link channel between the plurality of base stations and the terminal using the channel matrix and the inter-cell channel coefficient.

* * * * *